March 31, 1953 G. J. WARING 2,633,115
CONTROL OF INTERNAL-COMBUSTION ENGINES
Filed May 26, 1949 3 Sheets-Sheet 3

INVENTOR
Gerard James Waring
BY *A. T. O'dell*
ATTORNEY

Patented Mar. 31, 1953

2,633,115

UNITED STATES PATENT OFFICE 2,633,115

CONTROL OF INTERNAL-COMBUSTION ENGINES

Gerard James Waring, Eccleston, England, assignor to Leyland Motors Limited, London, England, a company of Great Britain and Northern Ireland Application May 26, 1949, Serial No. 95,505
In Great Britain September 24, 1948

1 Claim. (Cl. 123—140)

This invention relates to the governing of internal combustion engines of the liquid fuel injection type by variation of the output of the fuel injection pump, and particularly to the governing of the output of the fuel pump by the opposing action of a spring and of a diaphragm closing a chamber connected to the induction pipe on the engine side of the throttle valve, and therefore subject to the throttle-controlled suction in the induction pipe.

By so designing the pump control mechanism that a small movement of the rack or rod by which the mechanism is actuated is sufficient to bring about reduction of the fuel output from the amount required by the engine on full load to that sufficing on no load, such a governor may be made to control the engine speed on full load with great precision, a very small increase in engine speed beyond that for which the governor is set being enough to reduce the engine torque to zero; for example a governor set to maintain the engine speed at 2000 revolutions per minute at full load could reduce the torque to zero at a speed of 2180 R. P. M.

But this sensitiveness, desirable under load conditions, results in instability when the engine is idling; for the inevitable slight lag in adjustment of fuel delivery in response to a chance variation of engine speed leads to over compensation and to constant surging of the idling speed from near stalling to racing. Moreover on shutting down the throttle from full load to idling condition, stalling of the engine might result.

The purpose of the present invention is to make such a governor stable in action under idling conditions without impairing its sensitivity at high speeds.

One object of the invention is a governor including fuel pump output control means actuated by a diaphragm normally subjected to the vacuum reigning in the induction pipe on the engine side of the throttle valve, but relieved, at least in part, of such vacuum under idling conditions, and not under full load, full speed conditions, when said diaphragm passes the position for idling in the direction of further reducing the fuel pump output.

A more specific object of the invention is a governor including fuel pump output control means actuated by a diaphragm which seals a chamber connected by a pipe to the engine induction pipe on the engine side of the throttle valve and also connected by a second pipe to the engine induction pipe on the intake side of the throttle valve, said second pipe containing a valve opened by the diaphragm on passing the position for idling in the direction of further reducing the fuel pump output.

These and other objects of the invention will be more fully understood from the following explanation, and the following description of an embodiment of the invention.

It has been found that the fluctuations of output under idling conditions of a fuel pump controlled as first above explained could be prevented by providing in the diaphragm chamber a valve admitting air from the atmosphere, and causing this valve to be opened when the diaphragm moved beyond the position for idling, in the direction for reducing the fuel output of the pump. For if, then, a chance increase of engine speed occurred during idling, the resulting movement of the diaphragm, besides actuating the pump control—in a manner which, after an inevitable interval, would reduce the pump output and therefore reduce the engine speed—also at once reduced the vacuum in the diaphragm chamber by opening the valve; hence over-compensation was avoided.

But this valve also had a disturbing effect upon the governing of the engine under full load conditions. Upon the governor coming into action to check an increase of engine speed the valve opened before the speed was much reduced, and while the fuel supply (because of the high speed) was adequate to maintain a substantial torque, corresponding, say, to half full load. No further reduction of fuel supply could occur until the engine speed so far increased that the suction increased in spite of the open valve in the diaphragm chamber; and thus the engine might reach an undesirable speed.

Under idling conditions a governor constructed in accordance with the present invention acts in substantially the same way as if the valve of the diaphragm chamber opened into the free air, for under idling conditions the pressure on the intake side of the throttle valve is practically atmospheric pressure. At full load, on the contrary, when the throttle valve is wide open the pressure is practically the same on the two sides of the throttle valve, and therefore there is no difference of pressure to urge air through the valve of the diaphragm chamber; hence, even when the valve is open it is ineffective.

The invention is illustrated in the accompanying drawings in which

Figure 1:
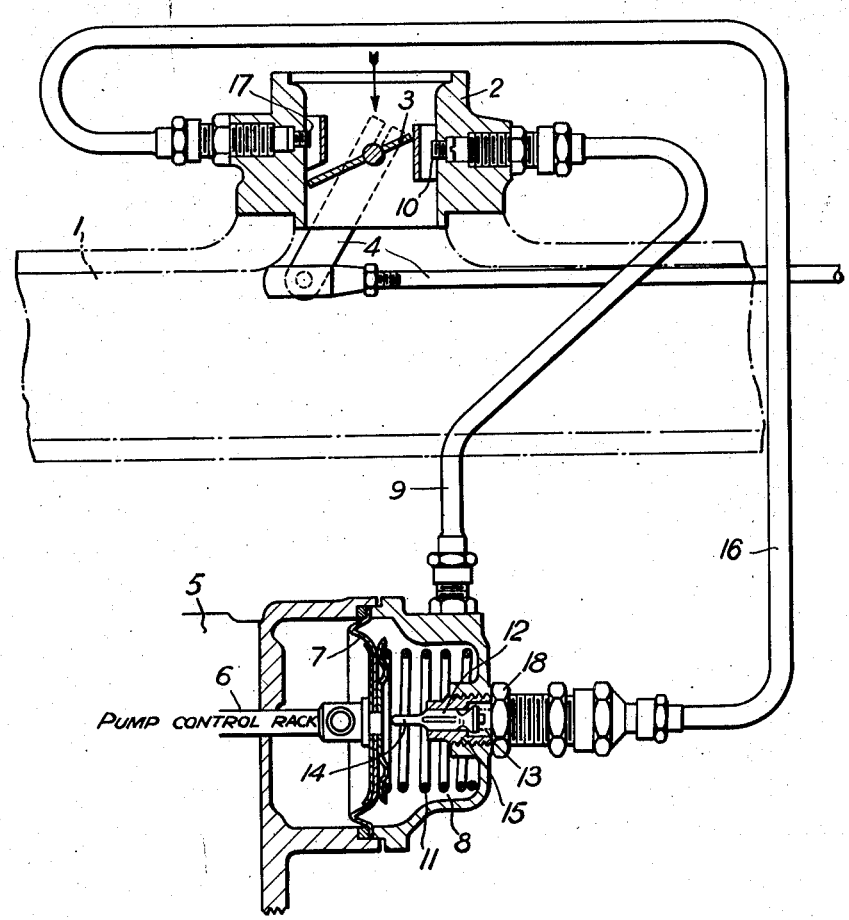
Figure 1 is a diagrammatic section through the governor.

In Figure 1 the inlet manifold of the engine to be controlled is shown in dot-dash lines at 1, and the induction pipe leading air into it at 2. The driver determines the power of the engine by acting on the throttle valve 3 through the linkage 4. A part of the engine fuel pump driven by the engine is shown at 5, and 6 is the rack or rod by which the mechanism controlling the pump output is actuated. This rack or rod 6 is attached to a diaphragm 7 which closes a chamber 8 connected by pipe 9 to the Pitot tube 10 opening into the induction pipe 2 on the engine side of the throttle valve 3. A spring 11 presses the diaphragm 7 and the rack or rod 6 in the direction for increasing the fuel supply.

In the chamber 8 is a valve 12 pressed upon its seat by a light spring 13. The stem 14 of the valve projects towards the diaphragm 7. The valve body 15 in which the seat of the valve 13 is formed is threaded and screwed into the chamber 8. It is adjusted in position so that the diaphragm 7 touches the stem 14 of the valve 12 under idling conditions, and when so adjusted it is locked by the nut 18. Any movement of the diaphragm 7 beyond the idling position in the direction for reducing the fuel supply opens the valve 13.

According to the invention the valve 13, instead of opening into the air around the chamber 8, is connected by a pipe 16 with a Pitot tube 17 opening into the induction pipe 2 on the intake side of the throttle valve 3.

Figure 2:
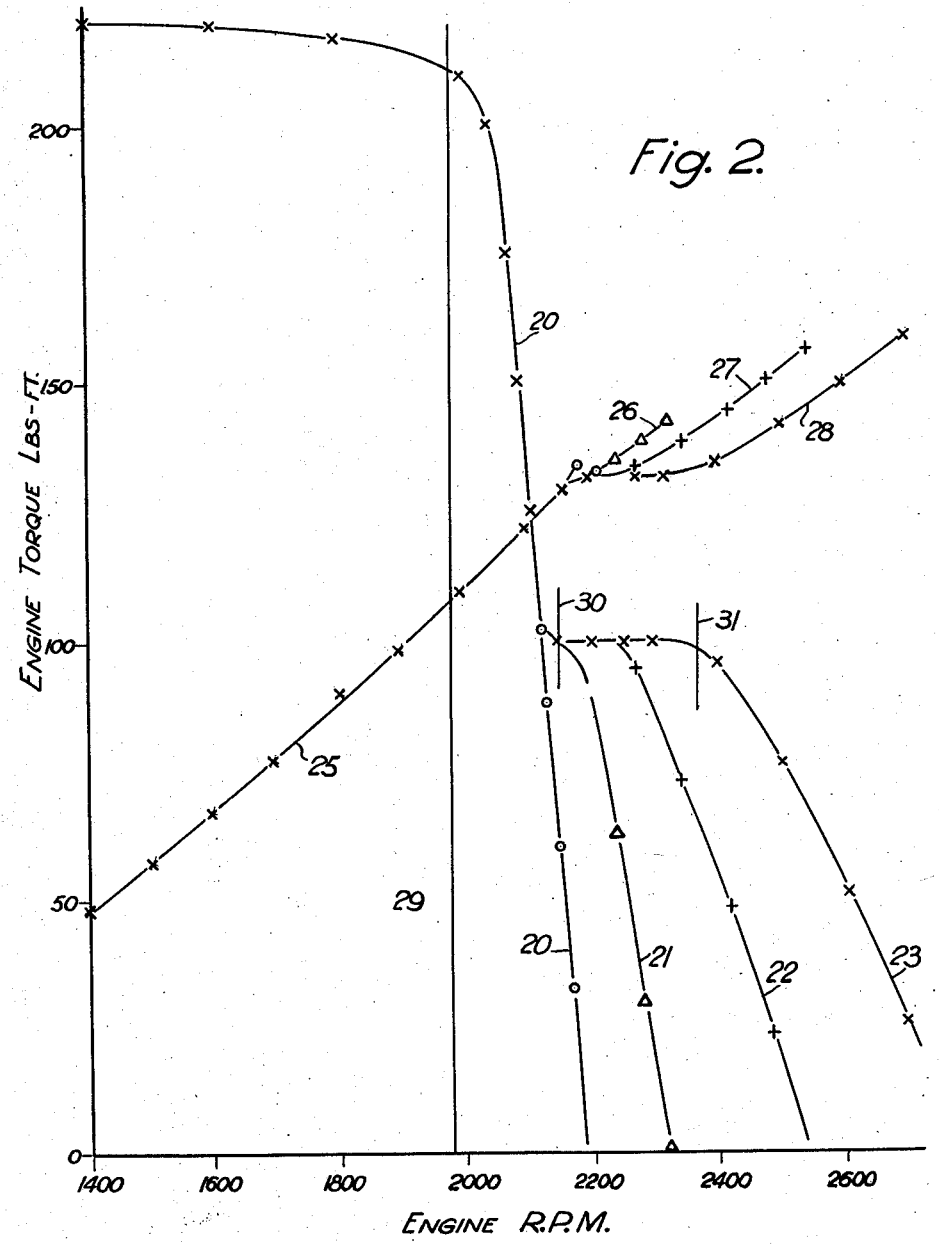
Figures 2, 3 and 4 are graphs explaining the effect of the invention.

In Figure 2 the graphs 20, 21, 22, 23 show engine torque plotted as ordinates against engine speed as abscissae; and the graphs 25, 26, 27, 28 show the vacuum in the chamber 8 (that is the reduction of pressure as compared with atmospheric pressure) also plotted as ordinates against the engine speed. All the graphs exhibit the behaviour of a governor when the engine has been running at maximum speed under full load. The graphs 23 and 28 relate to the known type of governor above described in which a valve such as the valve 13 opens directly into the atmosphere without any restriction of the flow of air through it. It is easy to see that on the engine speed rising beyond maximum full load speed indicated by the ordinate 29, the valve 13 opens at the speed indicated by ordinate 30. Until the valve opens the engine torque falls very steeply along the graph 20; but when the valve opens the torque is nearly one half the maximum torque and falls no further until the speed reaches the value represented by ordinate 31, when it again begins to fall with increasing speed, but not very steeply, as shown by graph 23. It is plain that the engine may reach undesirably high speeds. This is because, as graph 28 shows, the vacuum in the chamber 8 cannot further increase, once the valve 13 is opened, until a much higher speed is reached, for the open valve 13 acts like a wider opening of the throttle valve 3.

Naturally this undesirable effect could be diminished by reducing the area of the inlet to valve 13. Graphs 22 and 27, 21 and 26 show the effect of two successive reductions of that area. If the area is reduced to zero, that is, the valve 13 admits no air, the performance of the governor is wholly satisfactory, the torque falling steeply with rising speed according to the graph 20. But such reduction of area of the inlet of valve 13 results in instability under idling conditions, which was the reason for provision of the valve; and it is not possible to find an area of valve inlet which gives reasonable stability at idling speeds and does not gravely impair governing under full speed conditions.

A mechanical connection between the throttle valve 3 and the valve 13 for the purpose of reducing the area of inlet of the valve 13 only when the throttle valve is fully open would necessarily be complex and would be subject to wear and maladjustment.

Figure 3:
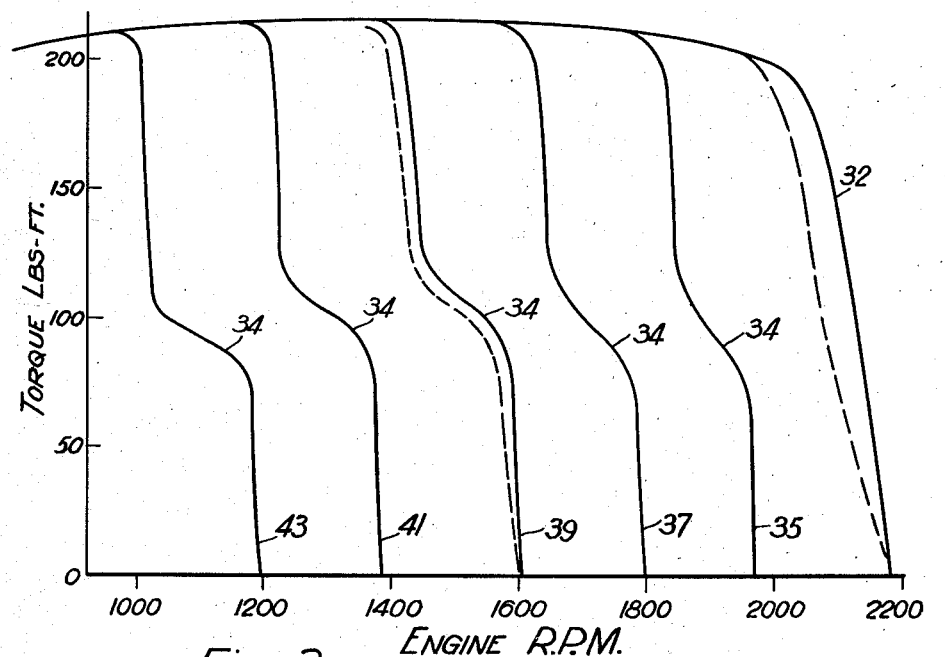
Figure 4:
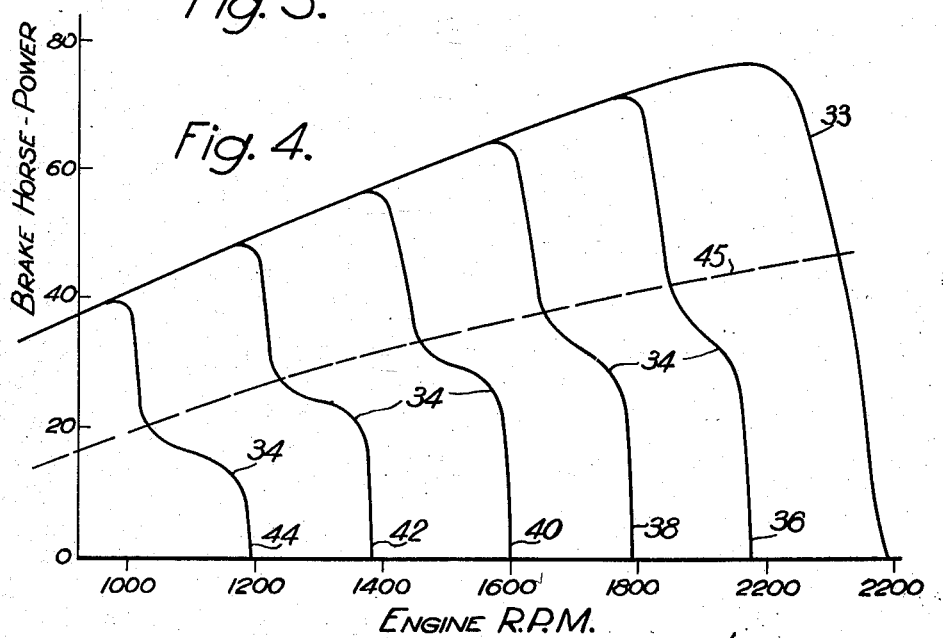

The performance of the governor shown in Figure 1 is illustrated by the graphs in Figures 3 and 4. In Figure 3 engine torque is plotted as ordinates against engine speed as abscissae; in Figure 4 the ordinates are horse power of the engine and the abscissae engine speeds. It is plain that the performance of the governor at high speeds, illustrated by the graphs 32, 33 is wholly satisfactory. At lower speeds, that is when the throttle valve 3 is partly closed, the effect of the valve 13 becomes apparent in the kink 34 in graphs 35 to 44, and is the more pronounced the more nearly the throttle is closed, since naturally the difference of pressure in the induction pipe 2 between one side and the other of the throttle valve 3 increases as the throttle valve is closed. This is what is needed, since the possibility of the speed surging up and down is absent under full load conditions but increases as the load lessens.

The dotted graph 45 in Figure 4 shows the engine power at varying speeds when the diaphragm 7 and pump control mechanism are in idling position.

The governor shown in Figure 1 has the further advantage that all the air used is drawn through the usual air filtering apparatus of the engine, none entering the diaphragm chamber from the surrounding atmosphere; so there is no risk of valve 13 being clogged by dust.

I claim:

An engine governor for a throttle-controlled internal combustion engine having liquid fuel injected by a pump, comprising a chamber, an adjustable control member movable in said chamber under pneumatic pressure and closing said chamber, a pipe connecting said chamber with the induction pipe of the engine on the engine side of the throttle valve, means connected with said adjustable control member for varying the output of the fuel pump per stroke in the sense of reducing output as the vacuum within its chamber increases, a second pipe connecting said chamber with the induction pipe of the engine on the intake side of the throttle valve, and a valve closing this second pipe, a part of said valve lying in the path of movement of said adjustable control member whereby said valve is opened upon said adjustable control member moving beyond idling position in the direction for reducing the pump output.

GERARD JAMES WARING.

REFERENCES CITED

The following references are of record in the file of this patent:

UNITED STATES PATENTS

| Number | Name | Date |
|---|---|---|
| 2,132,445 | Schweizer | Oct. 11, 1938 |

FOREIGN PATENTS

| Number | Country | Date |
|---|---|---|
| 445,448 | Great Britain | Apr. 9, 1936 |